US010003758B2

(12) United States Patent
Koskinen et al.

(10) Patent No.: US 10,003,758 B2
(45) Date of Patent: Jun. 19, 2018

(54) DEFECTIVE PIXEL VALUE CORRECTION FOR DIGITAL RAW IMAGE FRAMES

(71) Applicant: Microsoft Technology Licensing, LLC, Redmond, WA (US)

(72) Inventors: Samu Koskinen, Tampere (FI); Christian Mäkelä, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 15/144,781

(22) Filed: May 2, 2016

(65) Prior Publication Data

US 2017/0318244 A1    Nov. 2, 2017

(51) Int. Cl.
*H04N 5/367* (2011.01)
*H04N 9/04* (2006.01)
*H04N 9/64* (2006.01)

(52) U.S. Cl.
CPC ........... *H04N 5/367* (2013.01); *H04N 5/3675* (2013.01); *H04N 9/045* (2013.01)

(58) Field of Classification Search
CPC .............................. H04N 5/367; H04N 5/3675
USPC .................................................. 348/246, 247
See application file for complete search history.

(56) References Cited

U.S. PATENT DOCUMENTS

| | | | |
|---|---|---|---|
| 4,833,723 A | 5/1989 | Loveridge et al. | |
| 6,266,054 B1 | 7/2001 | Lawton et al. | |
| 7,826,675 B2 | 11/2010 | Kisilev | |
| 2004/0165785 A1 | 8/2004 | Monobe et al. | |
| 2006/0044425 A1 | 3/2006 | Yeung et al. | |
| 2006/0257046 A1 | 11/2006 | Rai et al. | |
| 2007/0040920 A1* | 2/2007 | Kinoshita | H04N 5/367 348/246 |
| 2008/0075354 A1 | 3/2008 | Kalevo | |
| 2008/0303920 A1* | 12/2008 | Kinoshita | H04N 5/2353 348/226.1 |
| 2011/0091127 A1 | 4/2011 | Kisilev et al. | |

(Continued)

FOREIGN PATENT DOCUMENTS

| | | |
|---|---|---|
| CN | 102445640 A | 5/2012 |
| CN | 104574295 A | 4/2015 |

(Continued)

OTHER PUBLICATIONS

Dilsizian, et al., "Atlas of Nuclear Cardiology", In Publication of Springer, Oct. 16, 2013, 1 page.

(Continued)

*Primary Examiner* — Anthony J Daniels

(57) ABSTRACT

In one example, at least a portion of a digital raw image frame captured by a digital image sensor is accessed. The accessed at least a portion of the digital raw image frame is de-noised without substantially modifying defective pixel values when present. In response to determining that at least one image frame pixel in the de-noised at least a portion of the digital raw image frame has a defective pixel value: the locations of each of the at least one image frame pixel having a defective pixel value are detected, and each defective pixel value in each detected location is corrected in the de-noised at least a portion of the digital raw image frame or the originally accessed at least a portion of the digital raw image frame.

20 Claims, 6 Drawing Sheets

| $O_1$ | $O_2$ | $O_3$ | $O_4$ | $O_5$ |
|---|---|---|---|---|
| $O_6$ | $I_1$ | $I_2$ | $I_3$ | $O_7$ |
| $O_8$ | $I_4$ | X | $I_5$ | $O_9$ |
| $O_{10}$ | $I_6$ | $I_7$ | $I_8$ | $O_{11}$ |
| $O_{12}$ | $O_{13}$ | $O_{14}$ | $O_{15}$ | $O_{16}$ |

520

(56) References Cited

U.S. PATENT DOCUMENTS

| | | | | |
|---|---|---|---|---|
| 2012/0050586 A1* | 3/2012 | Kanemitsu | ........... | H04N 5/3675 |
| | | | | 348/246 |
| 2012/0257265 A1 | 10/2012 | Bergman et al. | | |
| 2013/0021505 A1* | 1/2013 | Plowman | ............... | H04N 5/357 |
| | | | | 348/241 |
| 2015/0071564 A1* | 3/2015 | Sasaki | .................. | H04N 5/3675 |
| | | | | 382/275 |

FOREIGN PATENT DOCUMENTS

| | | |
|---|---|---|
| EP | 0496573 A1 | 7/1992 |
| EP | 1605403 A1 | 12/2005 |
| WO | 201010976 A3 | 1/2011 |
| WO | 2014133584 A1 | 9/2014 |

OTHER PUBLICATIONS

Lampropoulos, et al., "Applications of Photonic Technology 2: Communications, Sensing, Materials, and Signal Processing", In Publication of Springer, Jan. 31, 1998, 1 page.

Rahaman, et al., "Automatic Defect Detection and Classification Technique From Image: A Special Case Using Ceramic Tiles", In International Journal of Computer Science and Information Security, vol. 1, No. 1, May 2009, pp. 22-30.

"International Search Report and Written Opinion Issued in PCT Application No. PCT/US2017/029993", dated Jul. 7, 2017, 13 Pages.

* cited by examiner

DEFECTIVE PIXEL VALUE CORRECTION FOR DIGITAL RAW IMAGE FRAMES

BACKGROUND

Raw images produced by digital cameras may have defective image frame pixel values caused by defective image sensor pixels. Since raw images are typically noisy, detecting image frame pixels with defective pixel values from raw images and correcting them may be difficult. At the same time, de-noising algorithms typically used in digital cameras may smear defective image frame pixels with their neighboring pixels, which in turn may make it difficult to detect the defective image frame pixels from de-noised images and to correct them.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, a method comprises accessing at least a portion of a digital raw image frame captured by a digital image sensor; de-noising the accessed at least a portion of the digital raw image frame without substantially modifying defective pixel values when present; and in response to determining that at least one image frame pixel in the de-noised at least a portion of the digital raw image frame has a defective pixel value: detecting the locations of each of the at least one image frame pixel having a defective pixel value; and correcting each defective pixel value in each detected location in the de-noised at least a portion of the digital raw image frame or the originally accessed at least a portion of the digital raw image frame.

In another example, an apparatus and a digital camera have been discussed along with the features of the method.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

At least some of the disclosed examples may allow correction of defective image frame pixel values for digital raw image frames without interference from noise and smearing, thereby increasing accuracy of the defect correction.

Defective pixels are pixels in a charge-coupled device (CCD) or complementary metal-oxide-semiconductor (CMOS) image sensor in digital cameras that fail to sense light levels correctly. Pixel defects include dark dot defects of too little electrons generated in the pixel structure. Pixel defects further include bright dot defects of too much electrons generated in the pixel structure, creating a bright white pixel. This is commonly known as a "hot pixel". Herein, a pixel is defined to be defective when the offsets in intensity levels are distinctly larger than an associated noise level. Furthermore, a couplet defect refers to the presence of two defective pixels adjacent to each other in any direction in a given color channel or color plane.

Figure 1:
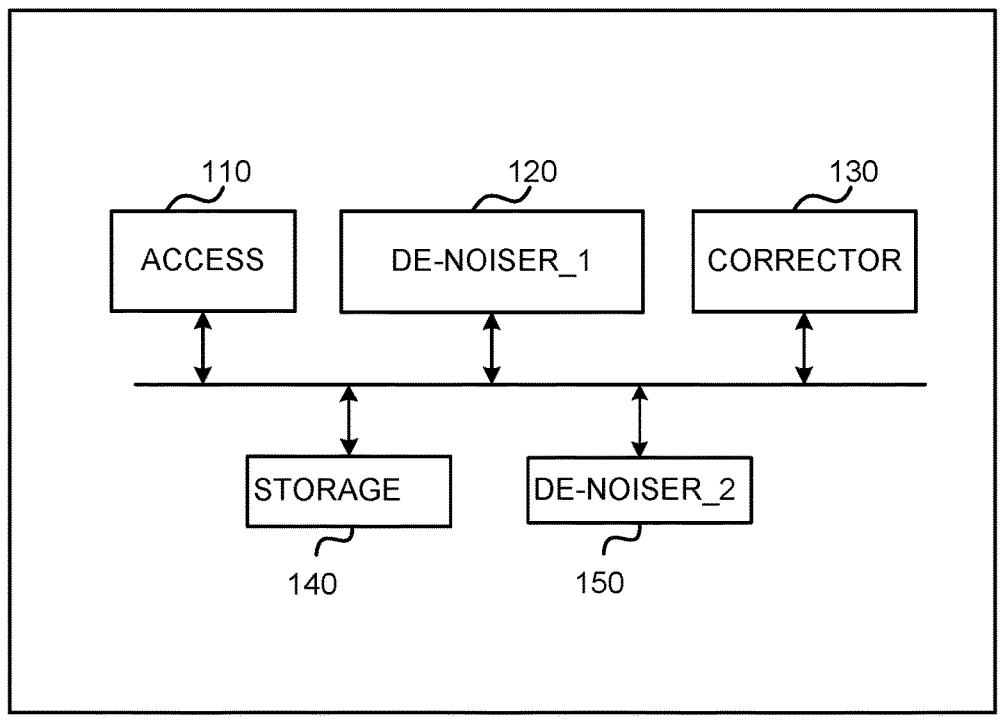
FIG. 1 is an example block diagram of an apparatus in accordance with an example embodiment.

FIG. 1 illustrates an apparatus 100 in accordance with an example embodiment. The apparatus 100 may be employed, for example, in the digital camera 200 of FIG. 2 which in turn may be employed, for example, in the electronic device 400 of FIG. 4. However, it should be noted that the apparatus 100 may also be employed on a variety of other devices and apparatuses, and therefore, embodiments should not be limited to application on devices and apparatuses such as the electronic device 400 of FIG. 4. Furthermore, it should be noted that at least some of the elements described below may not be mandatory and thus some may be omitted in certain embodiments. The apparatus 100 may be implemented e.g. as a part of an image processor or an image signal processor (ISP) which may in turn be implemented as a part of a system-on-a-chip (SoC).

The apparatus 100 comprises an access unit 110 that is configured to access at least a portion of a digital raw image frame captured by a digital image sensor.

The apparatus 100 further comprises a first de-noiser 120 that is configured to de-noise (i.e. reduce noise at least partially) in the accessed at least a portion of the digital raw image frame without substantially modifying defective pixel values when present. The first de-noiser 120 may be configured to perform the de-noising of the accessed at least a portion of the digital raw image frame without substantially modifying the defective pixel values when present by bilaterally filtering the accessed at least a portion of the digital raw image frame. A bilateral filter employs both spatial filtering and intensity based filtering.

The apparatus 100 further comprises a corrector 130 that is configured to determine whether at least one image frame pixel in the de-noised at least a portion of the digital raw image frame has a defective pixel value, and if yes, to detect the locations of each of the at least one image frame pixel having a defective pixel value, and to correct each defective pixel value in each detected location in one of the de-noised at least a portion of the digital raw image frame and the originally accessed at least a portion of the digital raw image frame.

The apparatus 100 may further comprise a storage 140 that is configured to store the detected locations of each of the at least one image frame pixel having a defective pixel value. Furthermore, a new pixel value to be used in correcting the defective pixel value may be stored with the respective detected location. Examples of such new values to be used in the correcting are described below in connection with FIGS. 5A and 5B.

The apparatus 100 may further comprise a second de-noiser 150 that is configured to de-noise the corrected at least a portion of the digital raw image frame in response to the corrector correcting each defective pixel value in the originally accessed at least a portion of the digital raw image frame. The de-noising of the corrected digital raw image frame may be performed with a different de-noising procedure than the de-noising of the originally accessed digital raw image frame. Alternatively, the de-noising of the corrected digital raw image frame may be performed with the same de-noising procedure as the de-noising of the originally accessed digital raw image frame.

Figure 2:
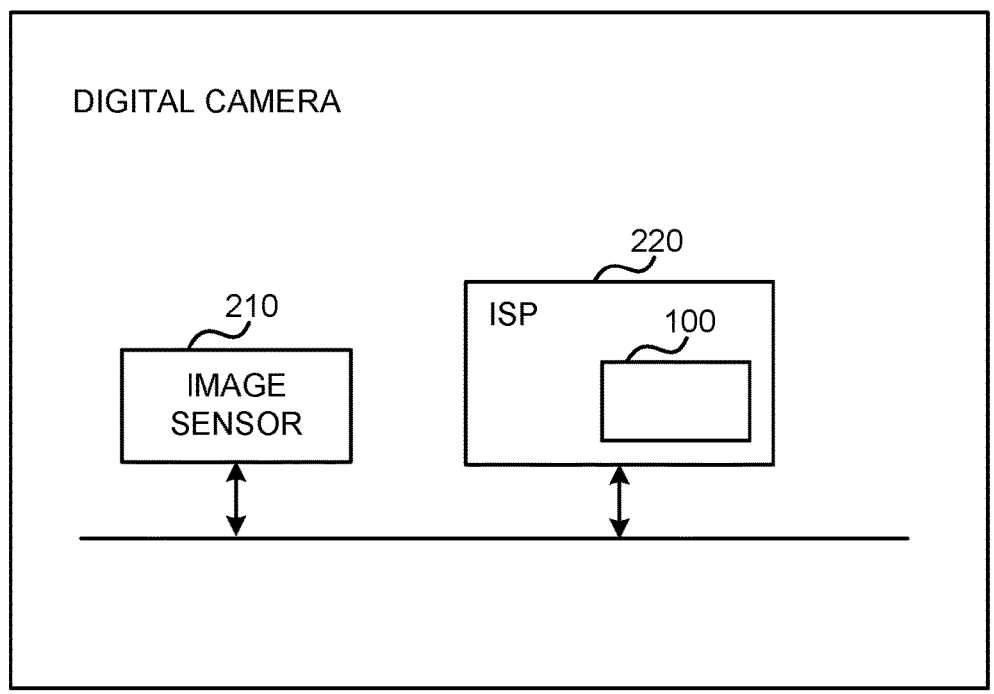
FIG. 2 is an example block diagram of a digital camera in accordance with an example embodiment.

FIG. 2 illustrates a digital camera 200 in accordance with an example embodiment. The digital camera 200 may be employed, for example, in the electronic device 400 of FIG. 4. However, it should be noted that the digital camera 200 may also be employed on a variety of other devices and apparatuses, and therefore, embodiments should not be limited to application on devices and apparatuses such as the electronic device 400 of FIG. 4. Furthermore, it should be noted that at least some of the elements described below may not be mandatory and thus some may be omitted in certain embodiments.

The digital camera 200 of FIG. 2 comprises a digital image sensor 210 that is configured to capture digital image frames. The digital image sensor 210 may include e.g. a charge-coupled device (CCD) sensor or a complementary metal-oxide-semiconductor (CMOS) sensor. The digital image sensor 210 may comprise e.g. a Bayer color filter array. The digital image sensor 210 may have at least one defective image sensor pixel causing a defective pixel value in a corresponding image frame pixel. The digital camera 200 may further comprise an optical system including a lens arrangement (not shown in FIG. 2).

The digital camera 200 further comprises the apparatus 100 of FIG. 1. The apparatus 100 comprises the access unit 110, the first de-noiser 120, and the corrector 130. The apparatus 100 may further comprise the storage 140 and the second de-noiser 150. The digital camera 200 may comprise an image signal processor 220 which may include the apparatus 100. The ISP 220 may be implemented as a part of a system-on-a-chip (not shown in FIG. 2).

In the example of FIG. 2, the functionalities and properties of the access unit 110, the first de-noiser 120, the corrector 130, the storage 140 and the second de-noiser 150 are substantially similar to those of their counterparts in the example of FIG. 1, so their descriptions are not repeated here in detail.

Figure 3A:
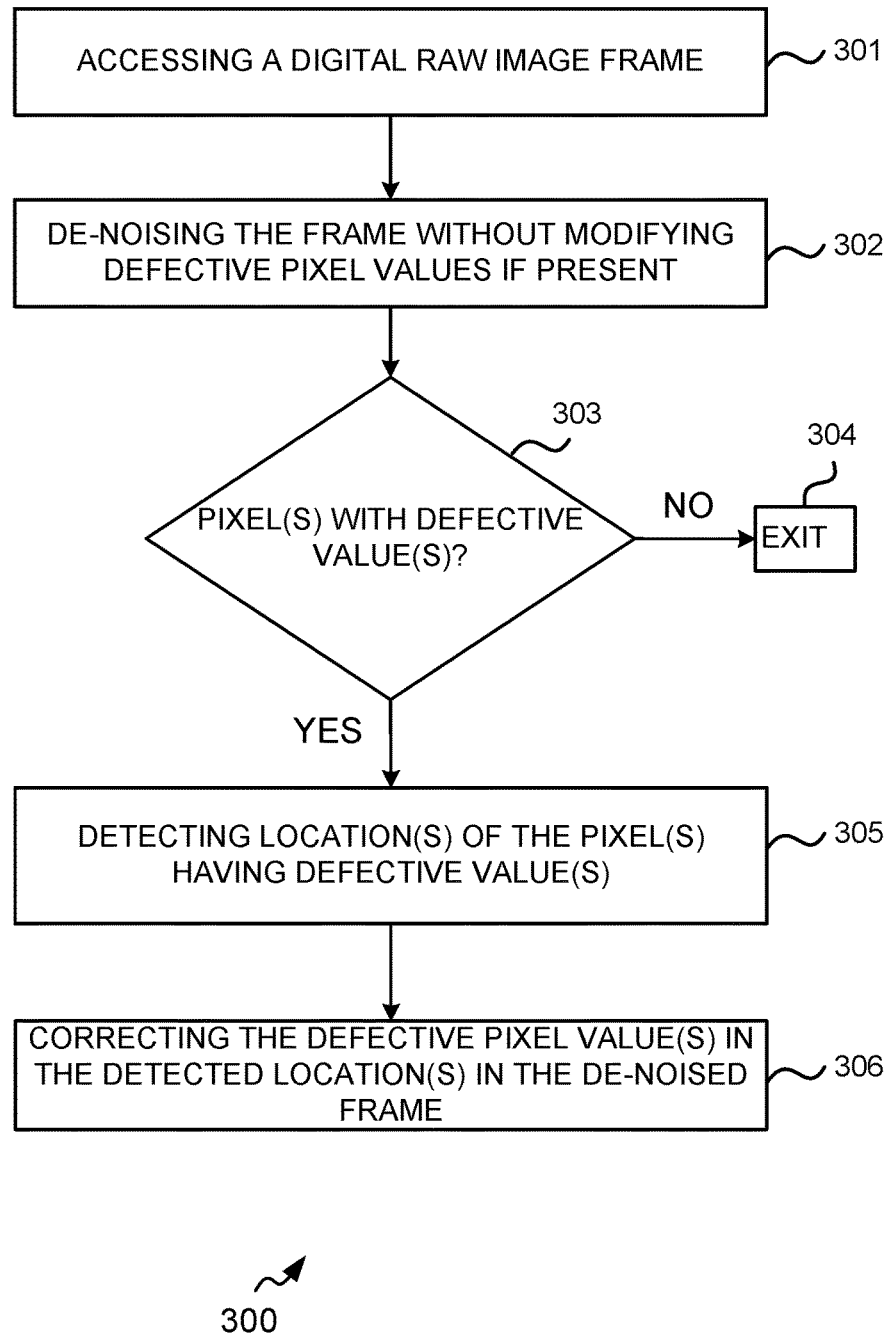
FIGS. 3A-3B are example flow diagrams of methods in accordance with example embodiments.

FIG. 3A is an example flow diagram of a method 300 in accordance with an example embodiment. At operation 301, at least a portion of a digital raw image frame captured by a digital image sensor is accessed.

At operation 302, the accessed at least a portion of the digital raw image frame is de-noised without substantially modifying defective pixel values when present. The de-noising of the accessed at least a portion of the digital raw image frame without substantially modifying defective pixel values when present may comprise e.g. bilaterally filtering the accessed at least a portion of the digital raw image frame.

At operation 303, the method determines whether at least one image frame pixel in the de-noised at least a portion of the digital raw image frame has a defective pixel value. If there is no pixel having a defective pixel value, the method exits at operation 304. Otherwise, the method proceeds to operation 305, in which the locations of each of the at least one image frame pixel having a defective pixel value are detected.

At operation 306, each defective pixel value in each detected location is corrected in the de-noised at least a portion of the digital raw image frame.

Operation 301 may be performed by the access unit 110 of FIG. 1. Operation 302 may be performed by the first de-noiser 120 of FIG. 1. Operations 303-306 may be performed by the corrector 130 of FIG. 1.

Figure 3B:
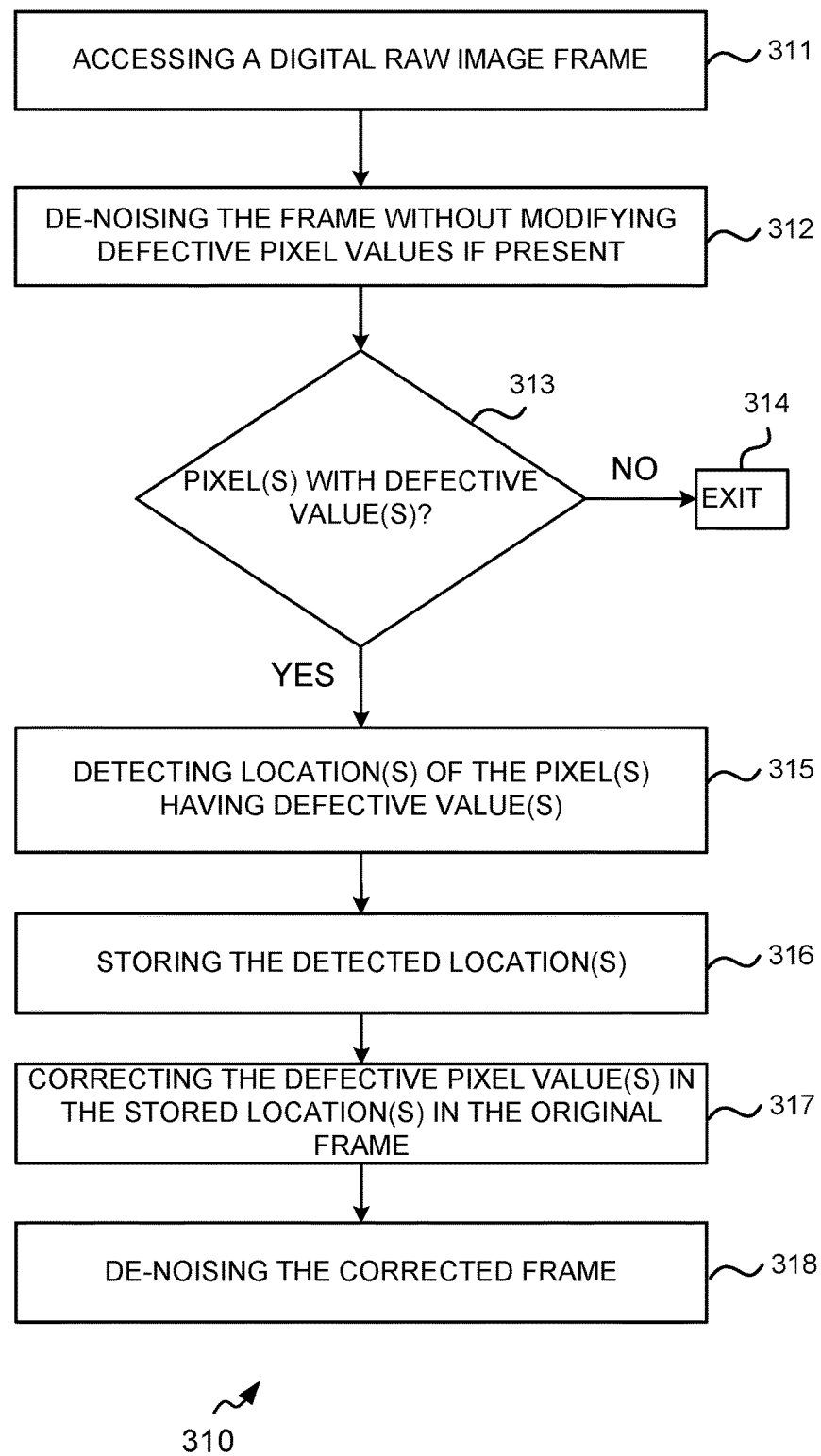

FIG. 3B is an example flow diagram of a method 310 in accordance with an example embodiment. At operation 311, at least a portion of a digital raw image frame captured by a digital image sensor is accessed.

At operation 312, the accessed at least a portion of the digital raw image frame is de-noised without substantially modifying defective pixel values when present. The de-noising of the accessed at least a portion of the digital raw image frame without substantially modifying defective pixel values when present may comprise e.g. bilaterally filtering the accessed at least a portion of the digital raw image frame.

At operation 313, the method determines whether at least one image frame pixel in the de-noised at least a portion of the digital raw image frame has a defective pixel value. If there is no pixel having a defective pixel value, the method exits at operation 314. Otherwise, the method proceeds to operation 315, in which the locations of each of the at least one image frame pixel having a defective pixel value are detected.

At operation 316, the detected locations of each of the at least one image frame pixel having a defective pixel value are stored. Furthermore, a new pixel value to be used in correcting the defective pixel value may be stored with the respective detected location. Examples of such new values to be used in the correcting are described below in connection with FIGS. 5A and 5B.

At operation 317, each defective pixel value in each detected location is corrected in the originally accessed at least a portion of the digital raw image frame.

At operation 318, de-noising the corrected at least a portion of the digital raw image frame is de-noised. The de-noising of the corrected digital raw image frame may be performed with a different de-noising procedure than the de-noising of the originally accessed digital raw image frame. Alternatively, the de-noising of the corrected digital raw image frame may be performed with the same de-noising procedure as the de-noising of the originally accessed digital raw image frame.

Operation 311 may be performed by the access unit 110 of FIG. 1. Operation 312 may be performed by the first de-noiser 120 of FIG. 1. Operations 313-315 and 317 may be performed by the corrector 130 of FIG. 1. Operation 316 may be performed by the storage 140 of FIG. 1. Operation 318 may be performed by the second de-noiser 150 of FIG. 1.

The example of FIG. 3B may provide increased accuracy due to the second de-noising operation 318 which may be optimized for preserving high image quality, whereas the first de-noising operation 312 may be optimized for allowing effective determination of defective pixels.

Single Pixel with Too High Intensity:

In an embodiment related to a single pixel out of a group of pixels being examined having a defective pixel value of too high intensity or signal level, at least in some of the examples disclosed in FIGS. 1-3B the determination that at least one image frame pixel in the de-noised at least a portion of the digital raw image frame has a defective pixel value may comprise performing the following separately for each color channel.

Figures 5A, 5B:
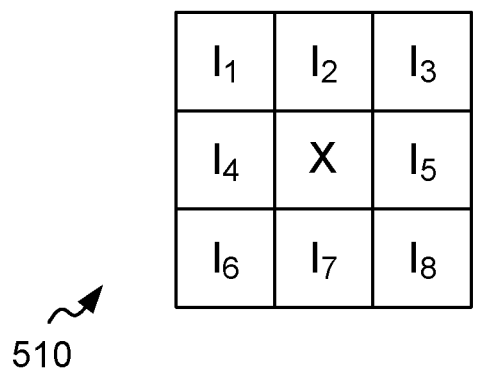
FIGS. 5A-5B are example diagrams illustrating defective pixel value determination.

With reference to FIG. 5A, X represents a pixel value of the currently examined image frame pixel, and $I_1$ to $I_8$ represent pixel values of its closest neighboring image frame pixels. It is to be noted that, in an embodiment, a larger or smaller neighboring area than eight pixels may be used. First, an average pixel value ave of the closest neighboring image frame pixels is calculated:

$$ave = \frac{I_1 + I_2 + I_3 + I_4 + I_5 + I_6 + I_7 + I_8}{8}.$$

As noted above, a larger or smaller neighboring area than eight pixels may be used. Accordingly, more or less than eight values may be used to calculate the average pixel value ave.

Here, the average pixel value ave of the closest neighboring image frame pixels represents a reference pixel value.

Then, a minimum value n for noise present in the closest neighboring image frame pixels is estimated based on physical properties of photons:

$$n=\sqrt{ave}.$$

Here, X is determined to be a defective pixel value if:

$X>ave+(n*threshold),$ and if the current image frame pixel (the one having the pixel value X) is the brightest of all the nine image frame pixels under examination, i.e. if X is higher than all of $I_1$ to $I_8$.

Here, threshold represents a predetermined parameter. In an embodiment, threshold may be selected to have a fixed value. Alternatively, threshold may be selected to have a dynamic value that depends on e.g. an exposure related parameter. For example, for short exposure times and low gain values, threshold may be selected to have a value that is significantly higher than 1 to provide less sensitivity. Correspondingly, for long exposure times and high gain values, threshold may be selected to have a value that is equal to 1 or slightly higher than 1 to provide more sensitivity.

Here, at least in some of the examples disclosed in FIGS. 1-3B, the correction of each defective pixel value may comprise replacing each defective pixel value e.g. with a pixel value of the brightest pixel of its closest neighboring image frame pixels. In another embodiment, the correction of each defective pixel value may comprise replacing each defective pixel value e.g. with its corresponding reference pixel value, i.e. the average pixel value ave of its closest neighboring image frame pixels.

Single Pixel with Too Low Intensity:

In another embodiment related to a single pixel out of a group of pixels being examined having a defective pixel value of too low intensity or signal level, at least in some of the examples disclosed in FIGS. 1-3B the determination that at least one image frame pixel in the de-noised at least a portion of the digital raw image frame has a defective pixel value may comprise performing the following separately for each color channel.

Again with reference to FIG. 5A, X represents a pixel value of the currently examined image frame pixel, and $I_1$ to $I_8$ represent pixel values of its closest neighboring image frame pixels. It is to be noted that, in an embodiment, a larger or smaller neighboring area than eight pixels may be used. First, an average pixel value ave of the closest neighboring image frame pixels is calculated:

$$ave = \frac{I_1 + I_2 + I_3 + I_4 + I_5 + I_6 + I_7 + I_8}{8}.$$

As noted above, a larger or smaller neighboring area than eight pixels may be used. Accordingly, more or less than eight values may be used to calculate the average pixel value ave.

Here, the average pixel value ave of the closest neighboring image frame pixels represents a reference pixel value.

Then, a minimum value n for noise present in the closest neighboring image frame pixels is estimated based on physical properties of photons:

$$n=\sqrt{ave}.$$

Here, X is determined to be a defective pixel value if:

$X<ave-(n*threshold),$ and if the current image frame pixel (the one having the pixel value X) is the darkest of all the nine image frame pixels under examination, i.e. if X is lower than all of $I_1$ to $I_8$.

Here, threshold represents a predetermined parameter. In an embodiment, threshold may be selected to have a fixed value. Alternatively, threshold may be selected to have a dynamic value that depends on e.g. an exposure related parameter. For example, for short exposure times and low gain values, threshold may be selected to have a value that is significantly higher than 1 to provide less sensitivity. Correspondingly, for long exposure times and high gain values, threshold may be selected to have a value that is equal to 1 or slightly higher than 1 to provide more sensitivity.

Here, at least in some of the examples disclosed in FIGS. 1-3B, the correction of each defective pixel value may comprise replacing each defective pixel value e.g. with a pixel value of the darkest pixel of its closest neighboring image frame pixels. In another embodiment, the correction of each defective pixel value may comprise replacing each defective pixel value e.g. with its corresponding reference pixel value, i.e. the average pixel value ave of its closest neighboring image frame pixels.

Bright Couplet Defects:

In another embodiment related to bright couplet defects, at least in some of the examples disclosed in FIGS. 1-3B the determination that at least one image frame pixel in the de-noised at least a portion of the digital raw image frame has a defective pixel value may comprise performing the following separately for each color channel.

With reference to FIG. 5B, a first maximum pixel value is determined, the first maximum pixel value being the maximum pixel value of the closest neighboring image frame pixels (having pixel values $I_1$ to $I_8$) of a current image frame pixel (having pixel value X).

Then, a second maximum pixel value is determined, the second maximum pixel value being the maximum pixel value of the closest (having pixel values $I_1$ to $I_8$) and second closest (having pixel values $O_1$ to $O_{16}$) neighboring image frame pixels of the current image frame pixel excluding the closest neighboring image frame pixel corresponding to the determined first maximum pixel value.

The current image frame pixel is determined to have a defective pixel value when the pixel value of the current image frame pixel is greater than a product of the determined second maximum pixel value and a predetermined threshold value, and the determined first maximum pixel value is greater than the product of the determined second maximum pixel value and the predetermined threshold value, i.e. when:

$X > (\text{MaxReference} * \text{Threshold})$, and $\text{MaxInner} > (\text{MaxReference} * \text{Threshold})$, wherein X represents the pixel value of the current image frame pixel, MaxInner represents the determined first maximum pixel value, MaxReference represents the determined second maximum pixel value, and Threshold represents a predetermined threshold value.

Here, Threshold may be selected to have a fixed value. Alternatively, Threshold may be selected to have a dynamic value that depends on e.g. an exposure related parameter. For example, for short exposure times and low gain values, Threshold may be selected to have a value that is significantly higher than 1 to provide less sensitivity. Correspondingly, for long exposure times and high gain values, Threshold may be selected to have a value that is equal to 1 or slightly higher than 1 to provide more sensitivity.

Here, at least in some of the examples disclosed in FIGS. 1-3B, the correcting of each defective pixel value may comprise replacing the defective pixel value of the current image frame pixel with the determined second maximum pixel value.

Dark Couplet Defects:

In another embodiment related to dark couplet defects, at least in some of the examples disclosed in FIGS. 1-3B the determination that at least one image frame pixel in the de-noised at least a portion of the digital raw image frame has a defective pixel value may comprise performing the following separately for each color channel.

With reference to FIG. 5B, a first minimum pixel value is determined, the first minimum pixel value being the minimum pixel value of the closest neighboring image frame pixels (having pixel values $I_1$ to $I_8$) of a current image frame pixel (having pixel value X).

Then, a second minimum pixel value is determined, the second minimum pixel value being the minimum pixel value of the closest (having pixel values $I_1$ to $I_8$) and second closest (having pixel values $O_1$ to $O_{16}$) neighboring image frame pixels of the current image frame pixel excluding the closest neighboring image frame pixel corresponding to the determined first minimum pixel value.

The current image frame pixel is determined to have a defective pixel value when the pixel value of the current image frame pixel is smaller than a product of the determined second minimum pixel value and a reciprocal of a predetermined threshold value, and the determined first minimum pixel value is smaller than the product of the determined second minimum pixel value and the reciprocal of the predetermined threshold value, i.e. when:

$X < (\text{MinReference} * 1/\text{Threshold})$, and $\text{MaxInner} < (\text{MinReference} * 1/\text{Threshold})$, wherein X represents the pixel value of the current image frame pixel, MinInner represents the determined first minimum pixel value, MinReference represents the determined second minimum pixel value, and Threshold represents a predetermined threshold value.

Here, Threshold may be selected to have a fixed value. Alternatively, Threshold may be selected to have a dynamic value that depends on e.g. an exposure related parameter. For example, for short exposure times and low gain values, Threshold may be selected to have a value that is significantly higher than 1 to provide less sensitivity. Correspondingly, for long exposure times and high gain values, Threshold may be selected to have a value that is equal to 1 or slightly higher than 1 to provide more sensitivity.

Here, at least in some of the examples disclosed in FIGS. 1-3B, the correcting of each defective pixel value may comprise replacing the defective pixel value of the current image frame pixel with the determined second minimum pixel value.

Figure 4:
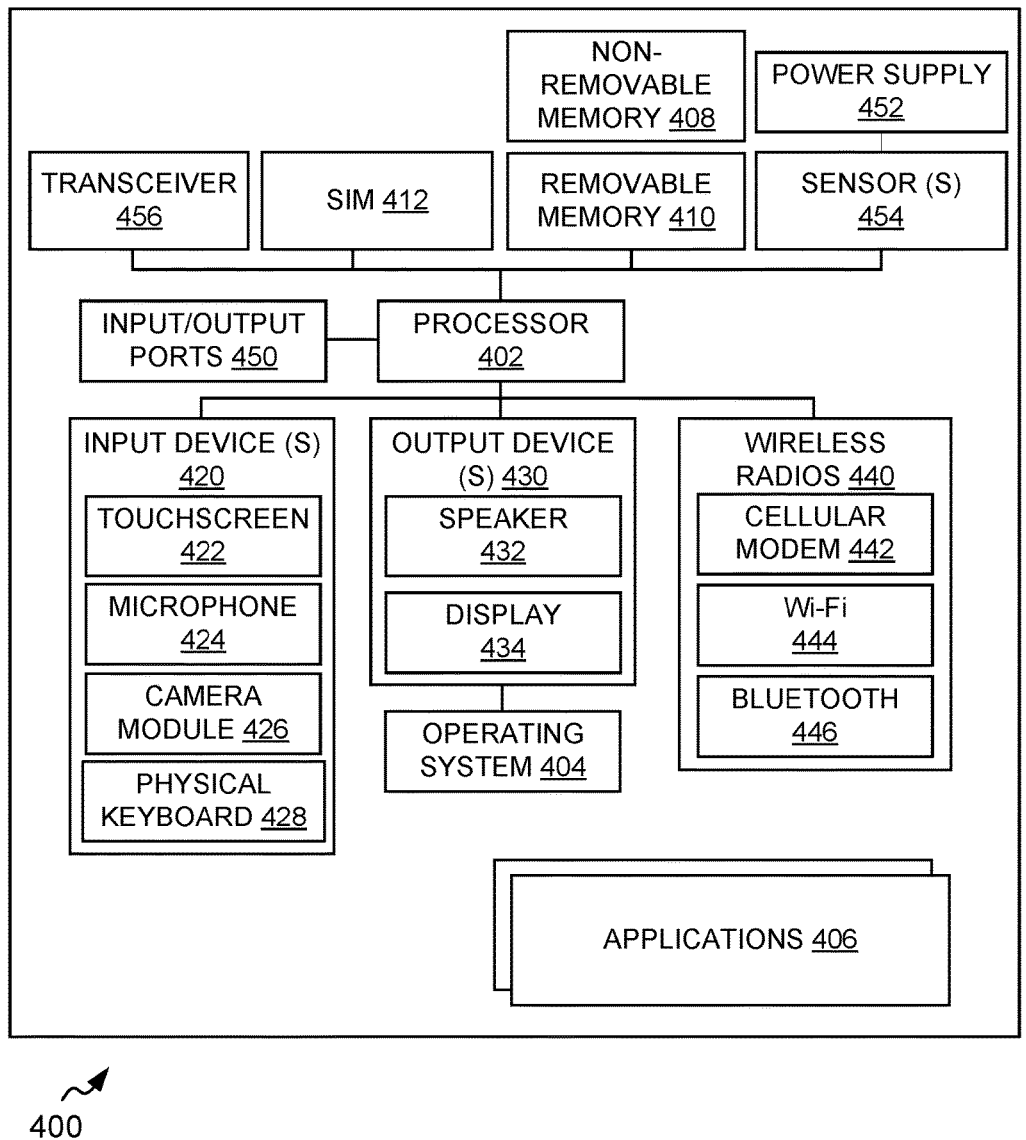
FIG. 4 illustrates an example block diagram of an electronic device capable of implementing example embodiments described herein.

At least in some of the examples disclosed in FIGS. 1-3B, the location of one image frame pixel having a defective pixel value is detected, the defective pixel value is corrected, and then the location of the next image frame pixel having a defective pixel value is detected and its defective pixel value is corrected, and so on. In another embodiment, the locations of all the image frame pixels having defective pixel values are detected, the detected locations are stored, and then the defective pixel values are corrected, FIG. 4 is a schematic block diagram of an electronic device 400 capable of implementing embodiments of the techniques described herein. It should be understood that the electronic device 400 as illustrated and hereinafter described is merely illustrative of one type of apparatus or an electronic device and should not be taken to limit the scope of the embodiments. As such, it should be appreciated that at least some of the components described below in connection with the electronic device 400 may be optional and thus in an example embodiment may include more, less or different components than those described in connection with the example embodiment of FIG. 4. As such, among other examples, the electronic device 400 could be any of apparatuses incorporating a digital camera or a digital imaging system. For example, the electronic device 400 may be implemented as a stand-alone digital camera device, e.g. a compact camera, a single-lens reflex (SLR) camera, or a mirrorless interchangeable-lens camera, or the electronic device 400 may be implemented e.g. as a smartphone, a tablet computer, a wearable camera or a web camera.

The illustrated electronic device 400 includes a controller or a processor 402 (i.e. a signal processor, microprocessor, ASIC, or other control and processing logic circuitry) for performing such tasks as signal coding, data processing, input/output processing, power control, and/or other functions. An operating system 404 controls the allocation and usage of the components of the electronic device 400 and support for one or more application programs 406. The application programs 406 can include common mobile applications, for instance, telephony applications, email applications, calendars, contact managers, web browsers, messaging applications, or any other application.

The illustrated electronic device 400 includes one or more memory components, for example, a non-removable memory 408 and/or removable memory 410. The non-removable memory 408 may include RAM, ROM, flash memory, a hard disk, or other well-known memory storage technologies. The removable memory 410 may include flash memory or smart cards. The one or more memory components may be used for storing data and/or code for running the operating system 404 and the applications 406. Example of data may include web pages, text, images, sound files, image data, video data, or other data sets to be sent to and/or received from one or more network servers or other devices via one or more wired or wireless networks. The electronic device 400 may further include a subscriber identity module (SIM) 412. The SIM 412 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution). The SIM 412 may comprise a virtual SIM. Furthermore, multiple SIMs may be utilized.

The electronic device 400 can support one or more input devices 420 and one or more output devices 430. Examples of the input devices 420 may include, but are not limited to, a touchscreen 422 (i.e., capable of capturing finger tap inputs, finger gesture inputs, multi-finger tap inputs, multi-finger gesture inputs, or keystroke inputs from a virtual keyboard or keypad), a microphone 424 (i.e., capable of capturing voice input), a camera module 426 (i.e., capable of capturing still picture images and/or video images) and a physical keyboard 428. The camera module 426 may include the digital camera 200 of FIG. 2. Examples of the output devices 430 may include, but are not limited to a speaker 432 and a display 434. Other possible output devices (not shown) can include piezoelectric or other haptic output devices. Some devices can serve more than one input/output function. For example, the touchscreen 422 and the display 434 can be combined into a single input/output device.

In an embodiment, the electronic device 400 may comprise a wireless radio(s) 440. The wireless radio(s) 440 can support two-way communications between the processor 402 and external devices, as is well understood in the art. The wireless radio(s) 440 are shown generically and can include, for example, a cellular modem 442 for communicating at long range with the mobile communication network, a Wi-Fi radio 444 for communicating at short range with a local wireless data network or router, and/or a BLUETOOTH radio 446. The cellular modem 442 is typically configured for communication with one or more cellular networks, such as a GSM/3G/4G network for data and voice communications within a single cellular network, between cellular networks, or between the mobile device and a public switched telephone network (PSTN).

The electronic device 400 can further include one or more input/output ports 450, a power supply 452, one or more sensors 454, for example an accelerometer, a gyroscope, a compass, or an infrared proximity sensor for detecting the orientation or motion of the electronic device 400, and a transceiver 456 (for wirelessly transmitting analog or digital signals). The illustrated components are not required or all-inclusive, as any of the components shown can be deleted and other components can be added.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing based devices it will be appreciated that the storage may be distributed or located remotely and accessed via a network or other communication link, for example by using a communication interface.

At least some of the examples disclosed in FIGS. 1-5B are able to provide correction of defective image frame pixel values for digital raw image frames without interference from noise and smearing, thereby increasing accuracy of the defect correction. This is due to performing the de-noising or noise reduction before the detection of the locations of the image frame pixels having defective pixel values, and due to performing the de-noising or noise reduction without substantially modifying defective pixel values when present. At least some of the examples disclosed in FIGS. 1-5B are able to provide correction of couplet defects after or before correction of single pixel defects without causing the single pixel defects to be corrected twice, thereby increasing accuracy of the defect correction. At least some of the examples disclosed in FIGS. 1-5B are able to provide correction of defective image frame pixel values that is dynamic in the sense that it allows correction of image frame pixel values that may be considered defective in a given image frame and non-defective in another image frame, depending on information content of each image frame.

An embodiment of a method comprises accessing at least a portion of a digital raw image frame captured by a digital image sensor; de-noising the accessed at least a portion of the digital raw image frame without substantially modifying defective pixel values when present; and in response to determining that at least one image frame pixel in the de-noised at least a portion of the digital raw image frame has a defective pixel value: detecting the locations of each of the at least one image frame pixel having a defective pixel value; and correcting each defective pixel value in each detected location in one of the de-noised at least a portion of the digital raw image frame and the originally accessed at least a portion of the digital raw image frame.

In an embodiment, alternatively or in addition to the above described embodiments, the method further comprises, before correcting each defective pixel value in the originally accessed at least a portion of the digital raw image frame, storing the detected locations of each of the at least one image frame pixel having a defective pixel value.

In an embodiment, alternatively or in addition to the above described embodiments, the method further comprises, after correcting each defective pixel value in the originally accessed at least a portion of the digital raw image frame, de-noising the corrected at least a portion of the digital raw image frame.

In an embodiment, alternatively or in addition to the above described embodiments, the determining that at least one image frame pixel in the de-noised at least a portion of the digital raw image frame has a defective pixel value comprises performing the following separately for each color channel: determining a first maximum pixel value, the first maximum pixel value being the maximum pixel value of the closest neighboring image frame pixels of a current image frame pixel; determining a second maximum pixel value, the second maximum pixel value being the maximum pixel value of the closest and second closest neighboring image frame pixels of the current image frame pixel excluding the closest neighboring image frame pixel corresponding to the determined first maximum pixel value; and determining the current image frame pixel to have a defective pixel value when: the pixel value of the current image frame pixel is greater than a product of the determined second maximum pixel value and a predetermined threshold value, and the determined first maximum pixel value is greater than the product of the determined second maximum pixel value and the predetermined threshold value.

In an embodiment, alternatively or in addition to the above described embodiments, the correcting of each defective pixel value comprises replacing the defective pixel value of the current image frame pixel with the determined second maximum pixel value.

In an embodiment, alternatively or in addition to the above described embodiments, the determining that at least one image frame pixel in the de-noised at least a portion of the digital raw image frame has a defective pixel value comprises performing the following separately for each color channel: determining a first minimum pixel value, the first minimum pixel value being the minimum pixel value of the closest neighboring image frame pixels of a current image frame pixel; determining a second minimum pixel value, the second minimum pixel value being the minimum pixel value of the closest and second closest neighboring image frame pixels of the current image frame pixel excluding the closest neighboring image frame pixel corresponding to the determined first minimum pixel value; and determining the current image frame pixel to have a defective pixel value when the pixel value of the current image frame pixel is smaller than a product of the determined second minimum pixel value and a reciprocal of a predetermined threshold value, and the determined first minimum pixel value is smaller than the product of the determined second minimum pixel value and the reciprocal of the predetermined threshold value.

In an embodiment, alternatively or in addition to the above described embodiments, the correcting of each defective pixel value comprises replacing the defective pixel value of the current image frame pixel with the determined second minimum pixel value.

In an embodiment, alternatively or in addition to the above described embodiments, the de-noising of the accessed at least a portion of the digital raw image frame without substantially modifying defective pixel values when present comprises bilaterally filtering the accessed at least a portion of the digital raw image frame.

An embodiment of an apparatus comprises an access unit configured to access at least a portion of a digital raw image frame captured by a digital image sensor; a first de-noiser configured to de-noise the accessed at least a portion of the digital raw image frame without substantially modifying defective pixel values when present; and a corrector configured to determine whether at least one image frame pixel in the de-noised at least a portion of the digital raw image frame has a defective pixel value, and if yes, to detect the locations of each of the at least one image frame pixel having a defective pixel value, and to correct each defective pixel value in each detected location in one of the de-noised at least a portion of the digital raw image frame and the originally accessed at least a portion of the digital raw image frame.

In an embodiment, alternatively or in addition to the above described embodiments, the apparatus further comprises a storage configured to store the detected locations of each of the at least one image frame pixel having a defective pixel value.

In an embodiment, alternatively or in addition to the above described embodiments, the apparatus further comprises a second de-noiser configured to de-noise the corrected at least a portion of the digital raw image frame in response to the corrector correcting each defective pixel value in the originally accessed at least a portion of the digital raw image frame.

In an embodiment, alternatively or in addition to the above described embodiments, the corrector is configured to perform the determining that at least one image frame pixel in the de-noised at least a portion of the digital raw image frame has a defective pixel value by performing the following separately for each color channel: determining a first maximum pixel value, the first maximum pixel value being the maximum pixel value of the closest neighboring image frame pixels of a current image frame pixel; determining a second maximum pixel value, the second maximum pixel value being the maximum pixel value of the closest and second closest neighboring image frame pixels of the current image frame pixel excluding the closest neighboring image frame pixel corresponding to the determined first maximum pixel value; and determining the current image frame pixel to have a defective pixel value when: the pixel value of the current image frame pixel is greater than a product of the determined second maximum pixel value and a predetermined threshold value, and the determined first maximum pixel value is greater than the product of the determined second maximum pixel value and the predetermined threshold value.

In an embodiment, alternatively or in addition to the above described embodiments, the corrector is configured to perform the correcting of each defective pixel value by replacing the defective pixel value of the current image frame pixel with the determined second maximum pixel value.

In an embodiment, alternatively or in addition to the above described embodiments, the corrector is configured to perform the determining that at least one image frame pixel in the de-noised at least a portion of the digital raw image frame has a defective pixel value by performing the following separately for each color channel: determining a first minimum pixel value, the first minimum pixel value being the minimum pixel value of the closest neighboring image frame pixels of a current image frame pixel; determining a second minimum pixel value, the second minimum pixel value being the minimum pixel value of the closest and second closest neighboring image frame pixels of the current image frame pixel excluding the closest neighboring image frame pixel corresponding to the determined first minimum pixel value; and determining the current image frame pixel to have a defective pixel value when: the pixel value of the current image frame pixel is smaller than a product of the determined second minimum pixel value and a reciprocal of a predetermined threshold value, and the determined first minimum pixel value is smaller than the product of the determined second minimum pixel value and the reciprocal of the predetermined threshold value.

In an embodiment, alternatively or in addition to the above described embodiments, the corrector is configured to perform the correcting of each defective pixel value by replacing the defective pixel value of the current image frame pixel with the determined second minimum pixel value.

In an embodiment, alternatively or in addition to the above described embodiments, the first de-noiser is configured to perform the de-noising of the accessed at least a portion of the digital raw image frame without substantially modifying the defective pixel values when present by bilaterally filtering the accessed at least a portion of the digital raw image frame.

An embodiment of a digital camera comprises a digital image sensor; and an image processor comprising an access unit configured to access at least a portion of a digital raw image frame captured by the digital image sensor; a first de-noiser configured to de-noise the accessed at least a portion of the digital raw image frame without substantially modifying defective pixel values when present; and a corrector configured to determine whether at least one image frame pixel in the de-noised at least a portion of the digital raw image frame has a defective pixel value, and if yes, to detect the locations of each of the at least one image frame pixel having a defective pixel value, and to correct each defective pixel value in each detected location in one of the de-noised at least a portion of the digital raw image frame and the originally accessed at least a portion of the digital raw image frame.

In an embodiment, alternatively or in addition to the above described embodiments, the image processor further comprises a storage configured to store the detected locations of each of the at least one image frame pixel having a defective pixel value.

In an embodiment, alternatively or in addition to the above described embodiments, the image processor further comprises a second de-noiser configured to de-noise the corrected at least a portion of the digital raw image frame in response to the corrector correcting each defective pixel value in the originally accessed at least a portion of the digital raw image frame.

In an embodiment, alternatively or in addition to the above described embodiments, the first de-noiser is configured to perform the de-noising of the accessed at least a portion of the digital raw image frame without substantially modifying the defective pixel values when present by bilaterally filtering the accessed at least a portion of the digital raw image frame.

The embodiments illustrated and described herein as well as embodiments not specifically described herein but within the scope of aspects of the disclosure constitute exemplary means for performing defective pixel value correction for digital raw image frames. For example, the elements illustrated in FIG. 1 to FIG. 2 constitute exemplary means for accessing at least a portion of a digital raw image frame, exemplary means for de-noising the accessed at least a portion of the digital raw image frame without substantially modifying defective pixel values when present, exemplary means for determining whether at least one image frame pixel in the de-noised at least a portion of the digital raw image frame has a defective pixel value, exemplary means for detecting the locations of each of the at least one image frame pixel with a defective pixel value, and exemplary means for correcting each defective pixel value in each detected location in one of the de-noised at least a portion of the digital raw image frame and the originally accessed at least a portion of the digital raw image frame.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The processes described herein may be performed by software in machine readable form on a tangible storage medium e.g. in the form of a computer program comprising computer program code means adapted to perform all the steps of any of the processes described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the blocks or elements identified, but that such blocks or elements do not comprise an exclusive list, and a system, a device or an apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A method, comprising:
   accessing at least a portion of a digital raw image frame captured by a digital image sensor;
   de-noising the accessed at least a portion of the digital raw image frame without substantially modifying defective pixel values when present; and
   in response to determining that at least one image frame pixel in the de-noised at least a portion of the digital raw image frame has a defective pixel value:
     detecting the locations of each of the at least one image frame pixel having a defective pixel value; and
     correcting each defective pixel value in each detected location in one of the de-noised at least a portion of the digital raw image frame and the originally accessed at least a portion of the digital raw image frame,
   wherein the determining comprises performing the following for each color channel:
     determining one of a first maximum pixel value or a first minimum pixel value of closest neighboring image frame pixels to a current image frame pixel;
     determining one of a second maximum pixel value or a second minimum value of closest and second closest neighboring image frame pixels of the current image frame pixel excluding the closest neighboring image frame pixel corresponding to the determined first maximum pixel value or the determined first minimum pixel value; and
     determining the current image frame pixel to have a defective pixel value upon a pixel value of the current image frame pixel being greater than a product value of (i) the first maximum value, the second maximum value, the first minimum value, or the second minimum value and (ii) a predetermined threshold value.

2. The method as claimed in claim 1, wherein before correcting each defective pixel value in the originally accessed at least a portion of the digital raw image frame, the method further comprises:
   storing the detected locations of each of the at least one image frame pixel having a defective pixel value.

3. The method as claimed in claim 1, wherein after correcting each defective pixel value in the originally accessed at least a portion of the digital raw image frame, the method further comprises:
   de-noising the corrected at least a portion of the digital raw image frame.

4. The method as claimed in claim 1, wherein determining that at least one image frame pixel in the de-noised at least a portion of the digital raw image frame has a defective pixel value comprises performing the following separately for each color channel:
   determining the current image frame pixel to have a defective pixel value upon:
   the pixel value of the current image frame pixel being greater than a product of the determined second maximum pixel value and the predetermined threshold value, and the determined first maximum pixel value being greater than the product of the determined second maximum pixel value and the predetermined threshold value.

5. The method as claimed in claim 4, wherein the correcting of each defective pixel value comprises:
   replacing the defective pixel value of the current image frame pixel with the determined second maximum pixel value.

6. The method as claimed in claim 1, wherein determining that at least one image frame pixel in the de-noised at least a portion of the digital raw image frame has a defective pixel value comprises performing the following separately for each color channel:
   determining the current image frame pixel to have a defective pixel value upon:
   the pixel value of the current image frame pixel being smaller than a product of the determined second minimum pixel value and a reciprocal of the predetermined threshold value, and the determined first minimum pixel value being smaller than the product of the determined second minimum pixel value and the reciprocal of the predetermined threshold value.

7. The method as claimed in claim 6, wherein the correcting of each defective pixel value comprises:
   replacing the defective pixel value of the current image frame pixel with the determined second minimum pixel value.

8. The method as claimed in claim 1, wherein the de-noising of the accessed at least a portion of the digital raw image frame without substantially modifying defective pixel values when present comprises bilaterally filtering the accessed at least a portion of the digital raw image frame.

9. An apparatus, comprising:
   an accessor configured to access at least a portion of a digital raw image frame captured by a digital image sensor;
   a first de-noiser configured to de-noise the accessed at least a portion of the digital raw image frame without substantially modifying defective pixel values when present; and
   a corrector configured to determine whether at least one image frame pixel in the de-noised at least a portion of the digital raw image frame has a defective pixel value, and if yes, to detect the locations of each of the at least one image frame pixel having a defective pixel value, and to correct each defective pixel value in each detected location in one of the de-noised at least a portion of the digital raw image frame and the originally accessed at least a portion of the digital raw image frame, wherein the corrector is configured to perform the determining that at least one image frame pixel in the de-noised at least a portion of the digital raw image frame has a defective pixel value by performing the following separately for each color channel:
determining one of a first maximum pixel value or a first minimum pixel value of closest neighboring image frame pixels to a current image frame pixel;
determining one of a second maximum pixel value or a second minimum value of closest and second closest neighboring image frame pixels of the current image frame pixel excluding the closest neighboring image frame pixel corresponding to the determined first maximum pixel value or the determined first minimum pixel value; and
determining the current image frame pixel to have a defective pixel value upon a pixel value of the current image frame pixel being greater than a product value of (i) the first maximum value, the second maximum value, the first minimum value, or the second minimum value and (ii) a predetermined threshold value.

10. The apparatus as claimed in claim 9, further comprising:
a storage configured to store the detected locations of each of the at least one image frame pixel having a defective pixel value.

11. The apparatus as claimed in claim 9, further comprising:
a second de-noiser configured to de-noise the corrected at least a portion of the digital raw image frame in response to the corrector correcting each defective pixel value in the originally accessed at least a portion of the digital raw image frame.

12. The apparatus as claimed in claim 9, wherein the corrector is configured to perform the determining that at least one image frame pixel in the de-noised at least a portion of the digital raw image frame has a defective pixel value by performing the following separately for each color channel:
determining the current image frame pixel to have a defective pixel value upon:
the pixel value of the current image frame pixel being greater than a product of the determined second maximum pixel value and the predetermined threshold value, and the determined first maximum pixel value being greater than the product of the determined second maximum pixel value and the predetermined threshold value.

13. The apparatus as claimed in claim 12, wherein the corrector is configured to perform the correcting of each defective pixel value by replacing the defective pixel value of the current image frame pixel with the determined second maximum pixel value.

14. The apparatus as claimed in claim 9, wherein the corrector is configured to perform the determining that at least one image frame pixel in the de-noised at least a portion of the digital raw image frame has a defective pixel value by performing the following separately for each color channel:
determining the current image frame pixel to have a defective pixel value upon:
the pixel value of the current image frame pixel being smaller than a product of the determined second minimum pixel value and a reciprocal of the predetermined threshold value, and the determined first minimum pixel value being smaller than the product of the determined second minimum pixel value and the reciprocal of the predetermined threshold value.

15. The apparatus as claimed in claim 14, wherein the corrector is configured to perform the correcting of each defective pixel value by replacing the defective pixel value of the current image frame pixel with the determined second minimum pixel value.

16. The apparatus as claimed in claim 9, wherein the first de-noiser is configured to perform the de-noising of the accessed at least a portion of the digital raw image frame without substantially modifying the defective pixel values when present by bilaterally filtering the accessed at least a portion of the digital raw image frame.

17. A digital camera, comprising:
a digital image sensor; and
an image processor, comprising:
an accessor configured to access at least a portion of a digital raw image frame captured by the digital image sensor;
a first de-noiser configured to de-noise the accessed at least a portion of the digital raw image frame without substantially modifying defective pixel values when present; and
a corrector configured to determine whether at least one image frame pixel in the de-noised at least a portion of the digital raw image frame has a defective pixel value, and if yes, to detect the locations of each of the at least one image frame pixel having a defective pixel value, and to correct each defective pixel value in each detected location in one of the de-noised at least a portion of the digital raw image frame and the originally accessed at least a portion of the digital raw image frame,
wherein the corrector is configured to perform the determining that at least one image frame pixel in the de-noised at least a portion of the digital raw image frame has a defective pixel value by performing the following separately for each color channel:
determining one of a first maximum pixel value or a first minimum pixel value of closest neighboring image frame pixels to a current image frame pixel;
determining one of a second maximum pixel value or a second minimum value of closest and second closest neighboring image frame pixels of the current image frame pixel excluding the closest neighboring image frame pixel corresponding to the determined first maximum pixel value or the determined first minimum pixel value; and
determining the current image frame pixel to have a defective pixel value upon a pixel value of the current image frame pixel being greater than a product value of (i) the first maximum value, the second maximum value, the first minimum value, or the second minimum value and (ii) a predetermined threshold value.

18. The digital camera as claimed in claim 17, wherein the image processor further comprises:
a storage configured to store the detected locations of each of the at least one image frame pixel having a defective pixel value.

19. The digital camera as claimed in claim 17, wherein the image processor further comprises:
a second de-noiser configured to de-noise the corrected at least a portion of the digital raw image frame in response to the corrector correcting each defective pixel value in the originally accessed at least a portion of the digital raw image frame.

20. The digital camera as claimed in claim 17, wherein the first de-noiser is configured to perform the de-noising of the accessed at least a portion of the digital raw image frame without substantially modifying the defective pixel values when present by bilaterally filtering the accessed at least a portion of the digital raw image frame.

\* \* \* \* \*